US006639547B2

United States Patent
Solbach

(10) Patent No.: US 6,639,547 B2
(45) Date of Patent: Oct. 28, 2003

(54) SYSTEM FOR FUNCTIONAL TESTING IN A CONTINUOUS-WAVE RADAR

(75) Inventor: Klaus Solbach, Muelheim (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 10/193,703

(22) Filed: Jul. 12, 2002

(65) Prior Publication Data

US 2003/0016165 A1 Jan. 23, 2003

(30) Foreign Application Priority Data

Jul. 14, 2001 (DE) ......................... 101 34 345

(51) Int. Cl.[7] ............................... G01S 7/40
(52) U.S. Cl. .................. 342/165; 342/173; 342/174; 342/128; 342/194
(58) Field of Search .............. 342/21, 128, 165, 342/169, 170, 171, 172, 173, 174, 194, 195

(56) References Cited

U.S. PATENT DOCUMENTS

| 4,660,042 A | | 4/1987 | Ekstrom ................. 342/175 |
|---|---|---|---|
| 4,968,967 A | * | 11/1990 | Stove ................... 342/165 |
| 4,970,519 A | * | 11/1990 | Minnis et al. ............ 342/165 |
| 5,431,568 A | | 7/1995 | Fey et al. .................. 434/2 |
| 6,075,480 A | | 6/2000 | Deliberis, Jr. ............ 342/169 |
| 6,404,378 B1 | * | 6/2002 | Solbach ................... 342/70 |
| 2003/0016165 A1 | * | 1/2003 | Solbach ................. 342/165 |
| 2003/0020649 A1 | * | 1/2003 | Solbach ................. 342/165 |

FOREIGN PATENT DOCUMENTS

| DE | 19918767 | 10/2000 |
|---|---|---|
| EP | 0364036 | 4/1990 |
| EP | 432851 A | * 6/1991 |
| EP | 1046926 A2 | * 10/2000 |
| GB | 2300989 | 11/1996 |

OTHER PUBLICATIONS

"High resolution ISAR radar for nondestructive testing", Dube, F.N.; Devlin, J.C.; AFRICON, 1996., IEEE AFRICON 4th, vol. 2, Sep. 24–27, 1996 pp. 897–902 vol. 2.*
Search Report, EP 02 01 0029.

* cited by examiner

Primary Examiner—John B. Sotomayor
(74) Attorney, Agent, or Firm—Crowell & Moring LLP

(57) ABSTRACT

A system for functional testing in a continuous-wave radar having a transmitter circuit for generating radar transmit signals, a transmit/receive antenna coupled by way of a circulator with the transmitter circuit, and a receiver circuit whose input is coupled with the transmit/receiver antenna by way of the circulator, for processing radar echo signals of a target object received at the transmit/receive antenna. The circulator relays the transmit signals generated by the transmitter circuit to the transmit/receive antenna, and splits off echo signals of the target object received from the transmit/receive antenna to the input of the receiver circuit. An RPC circuit coupled between the output and the input of the receiver circuit suppresses those portions of the transmit signals that are split off from the transmitter circuit and/or reflected from the transmit/receive antenna directly into the receiver circuit. The receiver circuit includes a modulator connected into the signal path of the receive signal, for generating a correction signal compensating the directly branched-off portions of the transmit signals. According to the invention, the modulator generates a test signal equal to a radar echo signal suitable for the functional testing in response to a control signal fed from the outside.

11 Claims, 1 Drawing Sheet

SYSTEM FOR FUNCTIONAL TESTING IN A CONTINUOUS-WAVE RADAR

BACKGROUND AND SUMMARY OF THE INVENTION

This application claims the priority of German patent document 101 34 345.0, filed Jul. 14, 2001, the disclosure of which is expressly incorporated by reference herein.

The invention relates to a system for functional testing in a continuous-wave radar.

Continuous wave radars, primarily frequency modulated (FMCW), are used for measuring distances or for imaging the environment. For testing the functional capability of the radar system, it is desirable to feed a high-frequency test signal as closely as possible to the radar antenna, and to compare the output signal of the overall system with a defined pattern. In a basic form, this is approximated in the case of altimeters (aviation) by connecting a delay line into the antenna feeding line, so that an individual target of a known distance (that is, the line length of the delay line) can be measured in the altimeter radar system. In other applications, such delay lines are undesirable for weight and space reasons, and a separate sinusoidal high-frequency signal is generated in the frequency generating module, which high-frequency signal is fed into the antenna or into the high-frequency module. Considerable expenditures are required in each case because the corresponding measures concern components and modules in the high-frequency part.

The invention is based on a continuous-wave radar of the type that contains a transmitter circuit for generating radar transmit signals, a transmit/receive antenna coupled to the transmitter circuit via a circulator, and a receiver circuit coupled by way of the circulator by means of its input with the transmit/receive antenna, for processing radar echo signals of a target object received at the transmit/receive antenna. The circulator relays the transmit signals generated by the transmitter circuit to the transmit/receive antenna, and splits off the echo signals of the target object received from the transmit/receive antenna to the input of the receiver circuit. An RPC (Reflected Power Canceller) circuit coupled between the output and the input of the receiver circuit suppresses portions of the transmit signals that are split off from the transmitter circuit and/or reflected from the transmit/receive antenna directly (that is, not as an echo signal) into the receiver circuit. The latter contains a modulator connected into the signal path of the transmit signal, for generating a correction signal compensating the directly branched-off portions of the transmit signals. Such continuous-wave radars are known from German Patent Documents DE 199 18 767 A1 and DE 101 34 386.8, from European Patent Document EP 0 364 036 A2 or from European Patent Document EP 0 372 641 A2.

The RPC circuit that suppresses the portion of the transmit signal branched off without radiation and back-reception by way of the transmit-receive antenna directly into the receiver circuit of the radar is described in the references indicated for this purpose in German Patent Document DE 199 18 767 A1.

Generally, known RPC circuits provide a control loop in which the portions of the transmit signal approaching the input of the receiver circuit and split-off directly from the transmitter circuit or reflected by reflection from the transmit/receive antenna are superimposed with an additional signal split-off from the transmitter and being of opposite phase thereto, such that a complete deletion is achieved. In this manner, a disadvantageous coupling-over of transmitter noise and a reflection from the antenna to the receiver circuit are suppressed.

The radars may be pure continuous-wave radars with a fixed frequency without modulation, or Doppler radars as well as frequency-modulated (FMCW) pulsed or interrupted CW radars.

One object of the invention is to provide a system for functional testing in a continuous-wave radar which can be implemented in a simple manner and without high additional circuit-related expenditures. In particular, the additional components required for the functional testing should result in no large weight or space requirement.

This and other objects and advantages are achieved by the system for the functional testing in a continuous-wave radar according to the invention, which system contains a transmitter circuit for generating radar transmit signals, a transmit/receive antenna coupled by way of a circulator with the transmitter circuit, and a receiver circuit whose input is coupled with the transmit/receive antenna by way of the circulator, for processing radar echo signals of a target object received at the transmit/receive antenna. The circulator relays the transmit signals generated by the transmitter circuit to the transmit/receive antenna, and splits off the echo signals of the target object received from the transmit/receive antenna, and feeds them to the input of the receiver circuit. An RPC circuit coupled between the output and the input of the receiver circuit suppresses portions of the transmit signals that are split off from the transmitter circuit and/or reflected from the transmit/receive antenna directly into the receiver circuit. The RPC circuit contains a modulator that generates a correction signal, which compensates the directly split off portions of the transmit signals. According to the invention, the modulator generates a test signal equal to a radar echo signal suitable for the functional testing in response to a control signal fed from the outside.

An important advantage of the system according to the invention is the fact that it utilizes the already existing modulator of the RPC circuit for generating a high-frequency test signal for the functional testing of the continuous-wave radar. As a result, only a small number of additional components is required for implementing the system for the functional testing. A special advantage is the fact that no additional expenditures are required in the area of the high-frequency module but only in the area of the baseband electronic system which can be implemented at low cost. Nevertheless, the system according to the invention permits the testing of the function of the entire high-frequency part, except for the transmit/receive antenna.

A function generator for generating the control signal fed to the modulator from the outside is preferably coupled with the modulator of the RPC circuit.

The modulator preferably has control inputs for receiving in-phase and phase quadrature components of a baseband signal for the receiver circuit, and the function generator generates in-phase and phase quadrature components of a baseband test signal as the control signal at the inputs of the modulator.

Advantageously, an adder circuit provided at the input of the modulator combines the control signal generated by the function generator with a feedback signal returned from the receiver circuit to the modulator for the purpose of suppressing the transmit signals branched off directly into the receiver circuit.

The adder circuit preferably contains one adder respectively coupled with the inputs of the modulator, for combining the in-phase and quadrature components of the baseband test signal generated by the function generator as the control signal for the modulator with the in-phase and quadrature components of the baseband signal of the receiver circuit.

According to an advantageous alternative embodiment of the invention, it is provided that the modulator of the RPC circuit, for coupling the correction signal compensating the directly branched off portions of the transmit signal and/or the test signal generated in response to the control signal fed from the outside, is provided in the signal path between the circulator and the input of the receiver circuit.

According to an alternative advantageous embodiment of the invention, the modulator of the RPC circuit (for coupling the correction signal compensating the directly branched-off portions of the transmit signal and/or the test signal generated in response to the control signal fed from the outside) is provided in the signal path between the circulator and the transmit/receive antenna and is coupled by way of the circulator with the input of the receiver circuit.

According to an advantageous embodiment of the invention, the function generator contains a programmable signal processor and a digital-to-analog converter connected to the signal processor, for generating the control signal fed to the modulator from the outside.

According to another advantageous embodiment, the function generator contains a memory with a fixedly stored data set and a digital-to-analog converter connected thereto for generating the control signal fed from the outside to the modulator.

According to an embodiment of the invention, the function generator generates a sinusoidal control signal.

According to another, particularly advantageous embodiment of the invention, the function generator generates one or more complex control signals which can be superimposed.

Other objects, advantages and novel features of the present invention will become apparent from the following detailed description of the invention when considered in conjunction with the accompanying drawings.

DETAILED DESCRIPTION OF THE DRAWINGS

The invention is based on known continuous-wave radar circuits in which an RPC-circuit is provided for suppressing portions of the transmit signal that are split off directly from the transmitter circuit or are branched off after a reflection at the transmit/receive antenna, into the receiver circuit of the radar.

The known RPC circuits provide a control loop in which that portion of the signal approaching the input of the receiver circuit which is either split off directly from the transmitter circuit or reflected from the antenna, is superimposed with another correction signal split off from the transmit signal, such that a complete deletion takes place. Such a continuous-wave radar circuit, which is known per se, is illustrated in FIG. 1a.

Figure 1A:
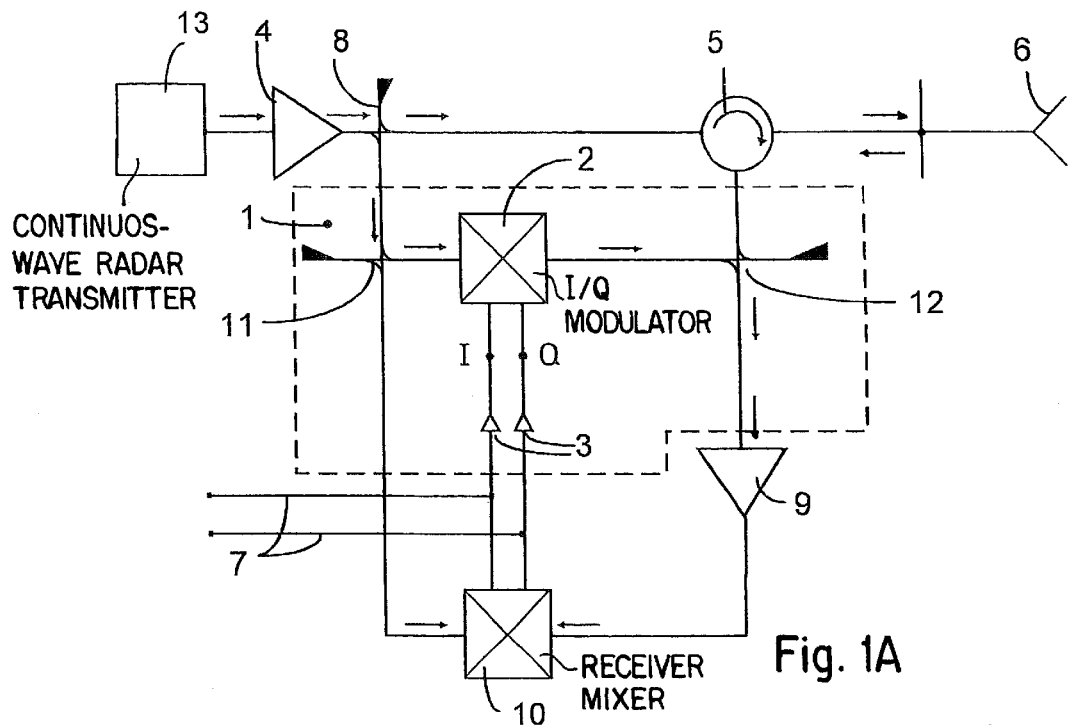
FIG. 1a is a block diagram of a system for functional testing in a continuous-wave radar according to a first embodiment of the invention.

In FIG. 1a, the RPC circuit 1, which is known per se, comprises an I/Q modulator (vector modulator) 2 and respective regulating amplifiers 3 for the I and Q signals (in-phase component and quadrature component) situated in the intermediate frequency range. (Although two regulating amplifiers for the I and Q signals are illustrated, it is possible that the number of the regulating amplifier may be larger or smaller, corresponding to the respective requirements.)

A radar transmitter circuit comprises a continuous-wave radar transmitter 13 and a final stage 4. The final stage 4 transmits the transmit signal of the frequency-modulated transmit circuit 13, 4 by way of a circulator (or sometimes referred to as a direction fork) 5 to a transmit/receive antenna 6. A portion of the transmit signal, as illustrated in FIG. 1a, is coupled out by a first directional coupler 8 and is fed to the RPC circuit 1.

The echo signals received again as a radar echo by the transmit/receive antenna 6 are fed from the antenna 6 by way of a circulator 5 to a receiver circuit consisting of a low-noise HF receiver amplifier 9 and a receiver mixer 10. A portion of the transmit signal coupled out by a second directional coupler 11 (connected behind the first directional coupler 8) is fed to the receiver mixer 10. The latter generates intermediate-frequency signals 7 in a known manner; these are used for the further processing of the radar echo signals. Further, the intermediate-frequency signals 7 are utilized by way of the regulating amplifiers 3 for controlling the I/Q modulator 2 in the RPC circuit 1.

The circulator 5 is provided for separating the transmit signals from the received echo signals. A portion of the power of the transmit signals, however, is split off without any previous radiation by the transmit/receive antenna 6 by way of the circulator 5 into the receiver circuit 9, 10. A further portion of the power of the transmit signal is reflected at the transmit/receive antenna 6 (without radiation) into the radar circuit, and is split off by way of the circulator 5 also into the receiver circuit 9, 10. These two portions of the transmit signal split off directly into the receiver circuit 9, 10 falsify the echo signals originating from the antenna 6, which impairs the sensitivity.

To avoid this phenomenon, the control loop in the RPC circuit 1 is designed such that the power of the transmit signal split off from the transmitter circuit 13, 4 (directly or after a reflection at the transmit/receive antenna 6 by way of the circulator 5 to the receiver circuit 9, 10) is compensated by the superimposition of a signal of the same size and of an opposite phase generated by the I/Q modulator 2. This correction signal is coupled by means of a third directional coupler 12 into the signal path between the circulator 5 and a receiver circuit 9, 10.

Another embodiment of the radar circuit according to the invention, illustrated in FIG. 1b, again shows a transmitter circuit which has a frequency-modulated continuous-wave radar transmitter 13 and a final stage 4 connected behind the latter. The final stage 4 transmits the transmit signal to a transmit/receive antenna 6 by way of a circulator 5. An I/Q modulator 2' of an RPC circuit, which as a whole has the reference number 1', is inserted into the signal path between the circulator 5 and the transmit/receive antenna 6. This I/Q modulator 2' represents a reflection modulator.

The echo signals received after the radiation from the transmit/receive antenna 6 are fed by way of the reflection I/Q modulator 2' and by way of the circulator 5 to a receiver circuit which comprises a low-noise HF receiver amplifier 9 and a receiver mixer 10 connected behind the latter.

As in the circuit illustrated in FIG. 1a, the circulator separates the transmit signals from the received echo signals. However, unavoidably, a portion of the power of the transmit signal is also split here, without any previous radiation, by way of the circulator 5 directly or after a reflection at the transmit/receive antenna 6 and then again by way of the circulator 5 into the input of the receiver amplifier 9. These branched-off signals falsify the echo signals originating from the antenna 6, which impairs the sensitivity.

To avoid this phenomenon, the control of the RPC circuit 1' is designed such that the power of the transmit signal reflected by the antenna 6 or the power of the transmit signal branched off by the circulator 5 is compensated by the superimposition of a signal of the same size and of an opposite phase which is generated by the reflection I/Q modulator 2'. This correction signal is coupled by means of the reflection I/Q modulator 2' directly into the signal path between the transmit/receive antenna 6 and the circulator 5, and is fed by way of the latter to the receiver circuit 9, 10. The receiver mixer 10 emits intermediate-frequency signals 7 again in a known manner which are used for the further processing of the radar echo signals and which are fed to the regulating amplifiers 3' of the RPC circuit 1' as I and Q signals.

Figure 1B:
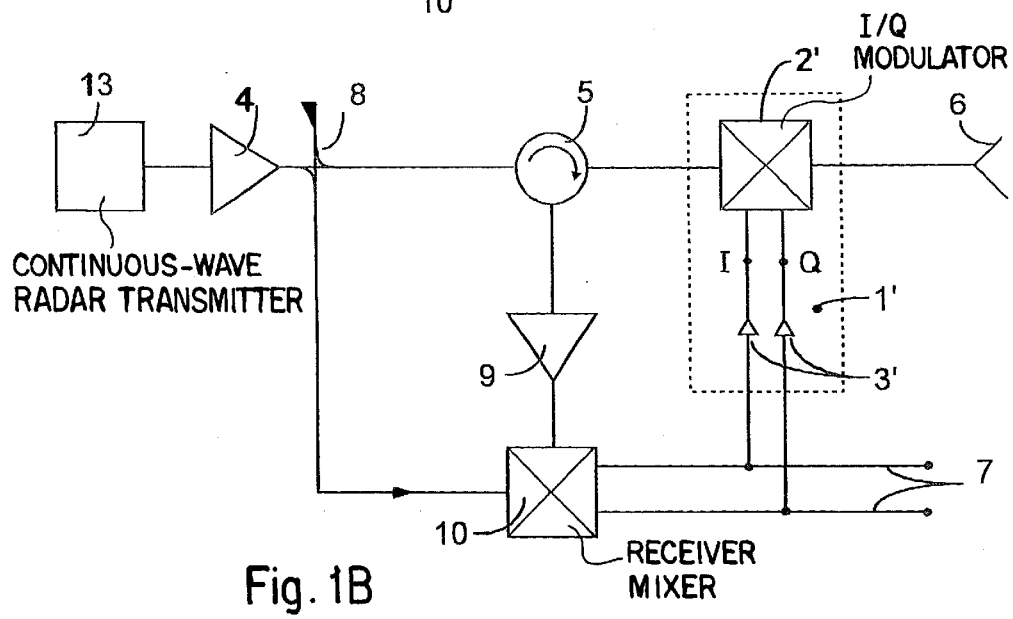
FIG. 1b is a block diagram of a system for functional testing in a continuous-wave radar according to another embodiment of the invention.
Figure 2:
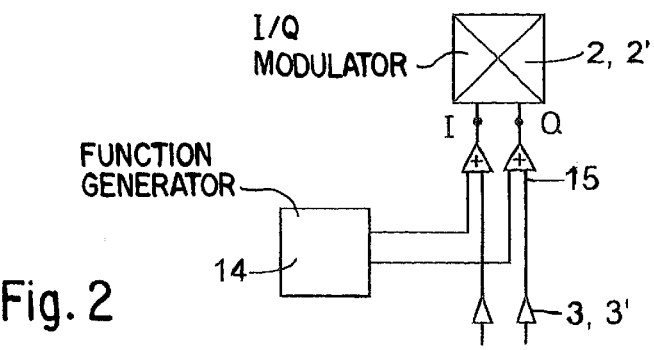
FIG. 2 is a partial representation of the system according to the invention for the functional testing in a continuous-wave radar which indicates the coupling of a function generator for feeding a test signal for the purpose of the functional testing.

For functional testing of the continuous-wave radar circuits illustrated in FIG. 1a and in FIG. 1b respectively, a control signal is fed from the outside to the modulator 2 and 2', in response to which, the latter respectively generates a test signal that is equal to a radar echo signal suitable for the function testing. For this purpose, as illustrated in the manner of a cutout in FIG. 2, a function generator 14 is coupled by way of adding stages 15 with the respective I or Q inputs of the modulator 2,2'. The signal of the regulating amplifiers 3,3' of the RPC circuit 1 and 1' respectively, is fed to another input of the adding stages 15.

In general, the modulator 2 and 2' of the RPC circuit 1 and 1' respectively is used for feeding a high-frequency signal to the receiver circuit 9, 10, which, in response to the control signal fed from the outside by the function generator 14, is to generate the above-mentioned test signal equal to the radar echo signal suitable for the function testing. This takes place in a manner that corresponds to how the modulator 2,2' in the closed control loop of the RPC circuit 1,1' generates the correction signal for compensating the directly split-off portions of the transmit signal. For this purpose, in-phase and quadrature components of the control signal situated in the baseband range are applied to the inputs I and Q of the modulator 2 and 2' respectively, so that, in the high-frequency branch, the high-frequency test signal appears which is converted correspondingly to the frequency range of the transmit signal. In this manner, the entire radar circuit including the high-frequency part can be functionally tested, only without the transmit/receive antenna 6, except the requirement of interventions in the high-frequency components of the radar circuit itself.

The used baseband test signal may assume various forms, depending on the modulation of the continuous-wave radar. For example, a sinusoidal signal at one of the two inputs in a continuous-wave Doppler radar simulates an individual target object of a fixed speed (the Doppler frequency corresponds to the frequency of the sinusoidal oscillation of the baseband test signal).

In modulated continuous-wave radars, more complex test signals may be required for simulating an individual target object. By superimposing various individual-object signals, complex target scenarios can also easily be generated, ranging to a continuous signal spectrum in imaging radar circuits.

The test signals can be generated in the function generator 14 in a manner known per se in the state of the art, for example, by using a programmable signal processor or by means of a fixedly stored data set in a memory with a subsequent digital-to-analog conversion for generating the analog voltage waveform.

The baseband test signal generated in this manner is superimposed in the adder circuits 3,3' (compare FIG. 2) on the control signal of the RPC circuit 1, 1', so that the complete function of the radar circuit is maintained, even when the test signal is fed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for functional testing in a continuous-wave radar, comprising:
    a transmitter circuit for generating radar transmit signals;
    a transmit/receive antenna coupled by way of a circulator with the transmitter circuit;
    a receiver circuit having an input that is coupled to the transmit/receive antenna by way of the circulator, for processing radar echo signals of a target object received at the transmit/receive antenna, the circulator relaying the transmit signals generated by the transmitter circuit to the transmit/receive antenna and splitting off echo signals of the target object received from the transmit/receive antenna, providing them to the input of the receiver circuit;
    an RPC circuit coupled between the output and the input of the receiver circuit for suppressing portions of the transmit signals split off from the transmitter circuit and/or reflected from the transmit/receive antenna directly into the receiver circuit;
    a modulator that is contained in the receiver circuit, and connected into the signal path of the control signal, for generating a correction signal compensating the directly split-off portions of the transmit signals;
    wherein the modulator generates a test signal equal to a radar echo signal suitable for the functional testing in response to a control signal fed from an external source.

2. The system according to claim 1, wherein said external source comprises a function generator, which is coupled to the modulator, for generating the control signal fed from the outside to the modulator.

3. The system according to claim 2, wherein:
    the modulator has control inputs for receiving in-phase and phase quadrature components of a baseband signal of the receiver circuit; and
    the function generator generates in-phase and phase quadrature components of a baseband test signal as a control signal at the inputs of the modulator.

4. The system according to claim 2, wherein an adder circuit provided at the input of the modulator, combines the control signal generated by the function generator with a feedback signal returned from the receiver circuit to the modulator for suppressing transmit signals that are split off directly into the receiver circuit.

5. The system according to claim 4, wherein the adder circuit contains respective adders coupled with the inputs of the modulator for combining the in-phase and quadrature components of the baseband test signal generated by the function generator with the in-phase and phase quadrature signals of the baseband signal of the receiver circuit.

6. The system according to claim 1, wherein the modulator of the RPC circuit is provided in the signal path between the circulator and the input of the receiver circuit.

7. The system according to claim 1, wherein the modulator of the RPC circuit is provided in the signal path between the circulator and the transmit/receive antenna and is coupled to the input of the receiver circuit by way of the circulator.

8. The system according to claim 2, wherein the function generator contains a programmable signal processor and a digital-to-analog converter connected thereto for generating the control signal fed to the modulator from the outside.

9. The system according to claim 2, wherein the function generator contains a memory with a fixedly stored dataset and a digital-to-analog converter connected thereto for generating the control signal fed to the modulator from the outside.

10. The system according to claim 2, wherein the function generator generates a sinusoidal control signal.

11. The system according to claims 2, wherein the function generator generates at least one complex control signal which can be superimposed.

* * * * *